(12) United States Patent
Alsop et al.

(10) Patent No.: US 12,099,866 B2
(45) Date of Patent: Sep. 24, 2024

(54) ADDRESS MAPPING-AWARE TASKING MECHANISM

(71) Applicant: Advanced Micro Devices, Inc., Santa Clara, CA (US)

(72) Inventors: Jonathan Alsop, Bellevue, WA (US); Shaizeen Aga, Santa Clara, CA (US); Nuwan Jayasena, Santa Clara, CA (US)

(73) Assignee: ADVANCED MICRO DEVICES, INC., Austin, TX (US)

( * ) Notice: Subject to any disclaimer, the term of this patent is extended or adjusted under 35 U.S.C. 154(b) by 729 days.

(21) Appl. No.: 17/135,381

(22) Filed: Dec. 28, 2020

(65) Prior Publication Data
US 2022/0206839 A1    Jun. 30, 2022

(51) Int. Cl.
*G06F 9/48* (2006.01)
*G06F 3/06* (2006.01)
*G06F 12/02* (2006.01)
*G06F 12/14* (2006.01)

(52) U.S. Cl.
CPC ............ *G06F 9/485* (2013.01); *G06F 3/0604* (2013.01); *G06F 3/0659* (2013.01); *G06F 3/0673* (2013.01); *G06F 12/0284* (2013.01); *G06F 12/0292* (2013.01); *G06F 12/145* (2013.01)

(58) Field of Classification Search
None
See application file for complete search history.

(56) References Cited

U.S. PATENT DOCUMENTS

| | | | |
|---|---|---|---|
| 6,341,338 B1 | 1/2002 | Dennie | |
| 7,627,723 B1* | 12/2009 | Buck | G06F 9/30018 711/155 |
| 8,387,056 B2 | 2/2013 | Loucks | |
| 2017/0255397 A1* | 9/2017 | Jayasena | G06F 12/0888 |
| 2018/0239709 A1 | 8/2018 | Zaykov et al. | |

OTHER PUBLICATIONS

International Prelimary Report on Patentability for PCT/US2021/062216, Jul. 13, 2023. (Year: 2023).*

(Continued)

*Primary Examiner* — Qing Yuan Wu
(74) *Attorney, Agent, or Firm* — Hickman Becker Bingham Ledesma LLP

(57) ABSTRACT

An Address Mapping-Aware Tasking (AMAT) mechanism manages compute task data and issues compute tasks on behalf of threads that created the compute task data. The AMAT mechanism stores compute task data generated by host threads in a set of partitions, where each partition is designated for a particular memory module. The AMAT mechanism maintains address mapping data that maps address information to partitions. Threads push compute task data to the AMAT mechanism instead of generating and issuing their own compute tasks. The AMAT mechanism uses address information included in the compute task data and the address mapping data to determine partitions in which to store the compute task data. The AMAT mechanism then issues compute tasks to be executed near the corresponding memory modules (i.e., in PIM execution units or NUMA compute nodes) based upon the compute task data stored in the partitions.

20 Claims, 4 Drawing Sheets

(56) References Cited

OTHER PUBLICATIONS

Mogul et al., "Internet Standard Subnetting Procedure", Network Working Group Request for Comments: 950, Aug. 1985, p. 1-18. (Year: 1985).*
Search Report, in International Application No. PCT/US2021/062216, dated Mar. 29, 2022, 9 pages.
International Preliminary Report on Patentability, in International Application No. PCT/US2021/062216, dated Jul. 13, 2023, 6 pages.
Current Claims, in International Application No. PCT/US2021/062216, dated Jul. 13, 2023, 5 pages.

* cited by examiner

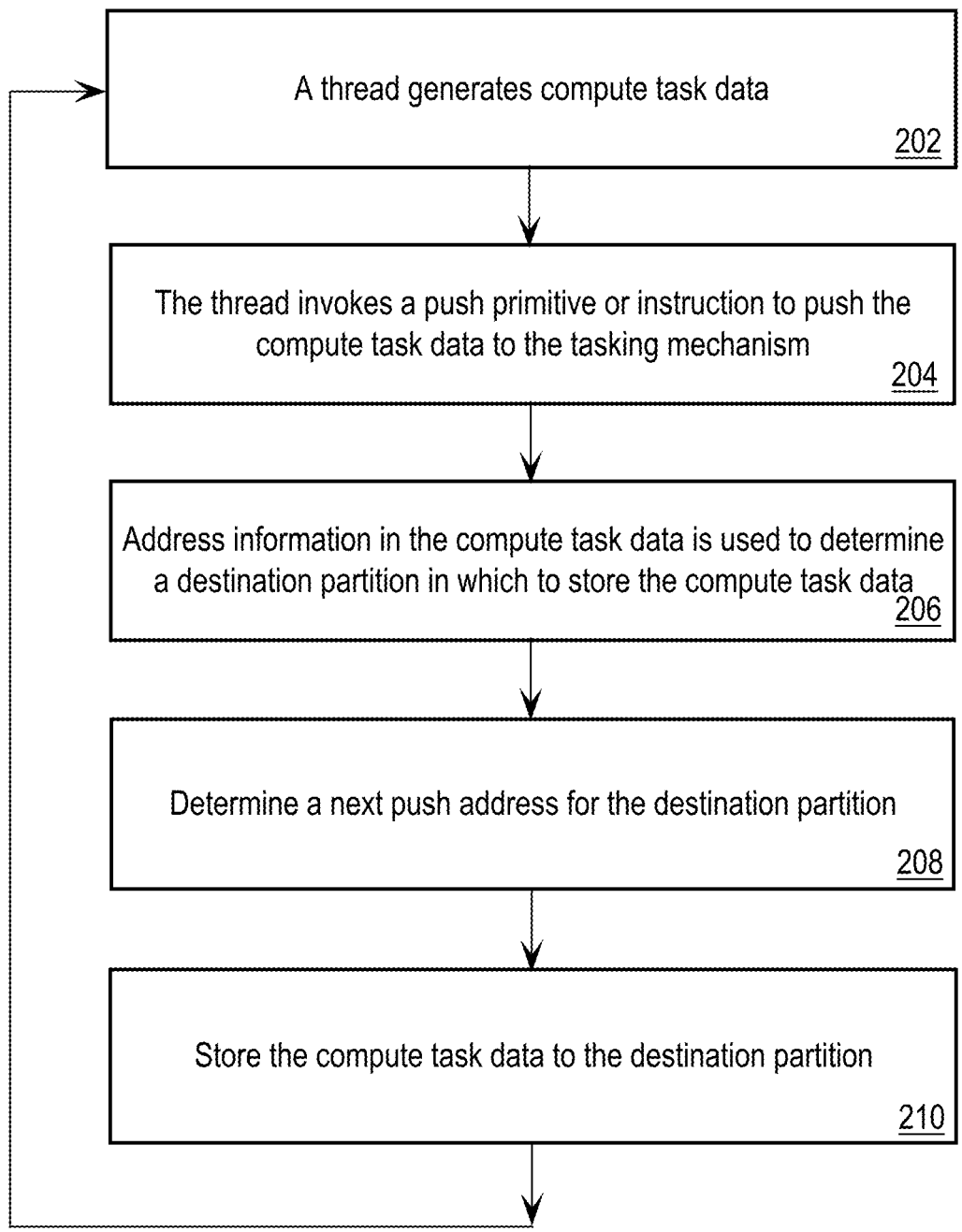

ADDRESS MAPPING-AWARE TASKING MECHANISM

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers. This allows a memory controller to trigger computation across multiple memory modules in parallel without requiring data movement across the memory module interface, which can greatly improve performance, particularly for data-limited workloads.

The effective use of PIM requires that software be developed with an awareness of hardware details and in particular, memory address to memory module mappings. This is needed because in order to operate on multiple elements of memory data in a single bank-local PIM execution unit, for example to perform reduction of elements in an array, all the memory addresses of the target operands must map to the same physical memory bank. Also, PIM commands from separate host threads that use the same bank and PIM registers cannot be concurrently processed by a PIM execution unit because doing so could cause so called "PIM collisions" and corrupt intermediate data. Thus, software must prevent multiple PIM commands from different cores that target the same bank and PIM registers from being issued concurrently, which reduces the bandwidth benefits provided by PIM.

Even without PIM, software awareness of memory address to memory module mapping is beneficial for efficient execution of parallel applications in a Non-Uniform Memory Access (NUMA) system. As systems scale to include multiple compute and memory modules, the relative location of a compute module to the memory module it accesses can significantly affect performance. Although software awareness of mapping information may not be necessary for application correctness in this scenario, it can greatly improve performance if compute tasks are scheduled on compute modules near the memory modules they access.

Requiring software to be aware of memory address to memory module mappings is undesirable for multiple reasons. The mapping function is often different for different architectures, making code less portable. Also, the mapping function may be different for different implementations, even on the same architecture, which adds additional complexity to any mapping-aware software. For example, a mapping function may be dynamically programmed to optimize the data interleaving strategy for different workloads. Further, exposing hardware level memory address mappings to user software may create security vulnerabilities that malicious software can exploit. Finally, many software developers find it undesirable to consider the underlying details of hardware when developing software, which adversely impacts productivity.

Existing approaches for addressing these problems include using partitioned global address spaces, distributed task queue structures, first touch page allocation, and page migration. These mechanisms are primarily designed for sharing patterns with high regularity or data mappings at coarse, i.e., page-level, granularity. They do not sufficiently address the aforementioned problems for fine-grained and configurable mapping strategies and irregular access patterns that may require frequent dynamic address translation and consideration of fine-grained address striding patterns. For regular code patterns, it may be possible in some cases to automate correct and efficient task scheduling if access patterns and dependencies are statically known, and the schedule can be optimized for the data mapping of the underlying hardware. This is not possible, however, for algorithms that exhibit irregularity or any kind of runtime data dependence. Accordingly, there is a need for a solution for using PIM-enabled or NUMA system in a manner that does not require an awareness of memory address to memory module mappings and that is effective in applications involving irregular data access patterns.

BRIEF DESCRIPTION OF THE DRAWINGS

Embodiments are depicted by way of example, and not by way of limitation, in the figures of the accompanying drawings and in which like reference numerals refer to similar elements.

FIG. 2A is a flow diagram that depicts threads pushing compute task data to a tasking mechanism.

DETAILED DESCRIPTION

Figure 1:
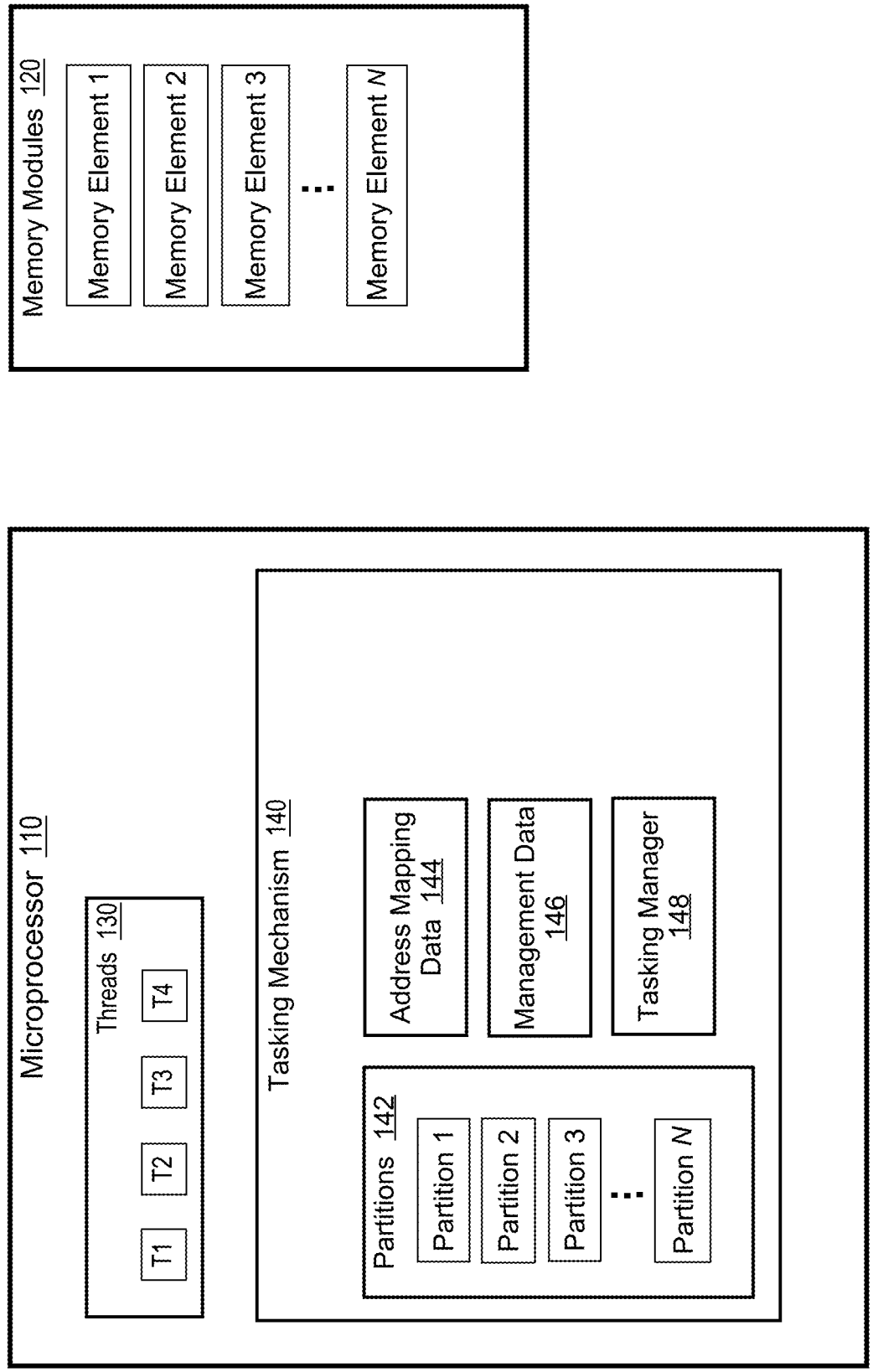
FIG. 1 is a block diagram that depicts a microprocessor arrangement.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Architecture
III. Managing Compute Task Data Using the Tasking Mechanism

I. Overview

An Address Mapping-Aware Tasking (AMAT) mechanism provides a technical solution to the problems associated with using PIM-enabled or NUMA systems in a multi-threaded environment by organizing compute tasks and task data, and facilitating the correct/efficient placement of compute task execution. As used herein, the term "compute task"

refers to one or more PIM or non-PIM instructions that are executed together at a single location, i.e., at a single PIM module or NUMA compute node. The term "compute task data" refers to data that specifies one or more input parameters of such a compute task and may include, for example, one or more operations to be executed, one or more addresses or index values, one or more data values, dependency information, priority information, etc.

The AMAT mechanism stores compute task data generated by host threads in a set of logical partitions in memory, where each partition is designated for a particular memory module or memory sub-module. The AMAT mechanism maintains address mapping data that maps address information to partitions to enable compute task data to be stored to a particular partition. The partition selected for a compute task's data may be based upon address information contained in the compute task data itself, e.g., the AMAT partition corresponding to the memory module containing data that will be processed by the task according to an input index parameter, or based on which partition is least occupied, e.g., to reduce load imbalance across compute and memory modules when the compute task data contains all data accessed by the task.

In operation, threads push compute task data to the AMAT mechanism before the compute tasks are executed. The AMAT mechanism determines a partition for the task as described herein and stores the compute task data to that partition. After being stored to an AMAT partition, compute tasks in each partition can then be independently processed such that they are executed near the memory module containing the compute task data.

For PIM-enabled systems, the AMAT mechanism ensures that all of the data that will be accessed during the processing of a PIM task are located in the same memory element. The AMAT mechanism also ensures that PIM commands from different threads cannot be issued concurrently to the same PIM-enabled memory element, thus avoiding PIM collisions. For NUMA systems, the AMAT mechanism ensures that some or all of the data that will be accessed during the processing of a compute task will be mapped to a memory element close to the compute module executing that task. The AMAT mechanism also ensures that concurrently executing tasks access data in different memory elements, reducing contention and imbalance. In PIM-enabled use cases, throughput and parallelism are improved by allowing PIM commands to different PIM execution units to be issued concurrently. The performance benefits are particularly significant in applications that are sensitive to memory bandwidth, such as machine learning with sparse or irregular memory accesses and minimal reuse of data. All of these benefits are realized with the AMAT mechanism without requiring that threads be aware of how memory addresses map to specific memory elements or PIM execution units, since the address mapping is handled by the AMAT mechanism. Embodiments are described hereinafter in the PIM-enabled memory context for purposes of explanation, but embodiments are not limited to this context and are applicable to other contexts such as NUMA systems.

II. Architecture

FIG. 1 is a block diagram that depicts a microprocessor arrangement 100. The microprocessor arrangement 100 includes a microprocessor 110 and memory modules 120. The microprocessor arrangement 100 may include additional elements that are not depicted in the figures or described herein for purposes of explanation.

The memory modules 120 may be implemented by any type of computer memory and embodiments are not limited to any particular type of memory. According to an embodiment, the memory modules 120 include N number of PIM-enabled memory elements, where each PIM-enabled memory element includes one or more banks and a corresponding PIM execution unit configured to execute PIM commands, although embodiments are not limited to Dynamic Random-Access Memory (DRAM) or memory elements in the form of banks. Each PIM execution unit includes processing logic, such as an Arithmetic Logic Unit (ALU), a lightweight Central Processing Unit (CPU), a Graphics Processing Unit (GPU), microcontroller, etc., and local storage, such as one or more registers.

The microprocessor 110 may be any type of CPU, GPU, microcontroller, or logic. The microprocessor 110 may have a single core or multiple cores, depending upon a particular implementation, and embodiments are not limited to microprocessors having any particular number of cores or types of cores. Although only one microprocessor is depicted, embodiments may also be distributed across multiple microprocessors, each with one or more threads, using well-studied prior techniques for distributed synchronization. The microprocessor 110 includes threads 130 and a tasking mechanism 140. The threads 130 are microprocessor threads and may include any number and types of threads. In the example depicted in FIG. 1 the threads include four threads identified at T1-T4 for purposes of explanation. The microprocessor 110 may include other elements, such as one or more memory controllers, caches, buses, interfaces, etc., that are not depicted in the figures and described herein for purposes of explanation. The microprocessor 110 and the memory modules 120 are communicatively coupled, for example, via one or more command buses and data buses.

The tasking mechanism 140 manages compute task data and facilitates correct and efficient execution of concurrent compute tasks. The tasking mechanism 140 includes partitions 142, address mapping data 144, management data 146, and a tasking manager 148. The tasking mechanism 140 may be implemented by computer hardware, computer software, or any combination of computer hardware and software and may include additional components and data that may vary depending upon a particular implementation.

The partitions 142 represent a conceptual division of compute task data, and the data contained in each partition is physically located at the corresponding memory element in the memory modules 120. Thus, in the context of PIM-enabled memory, each of the N number of partitions contains compute task data for a particular PIM-enabled memory module and a corresponding PIM execution unit. The partitions 142 may be implemented in any type of memory that is capable of storing compute task data such as one or more registers, one or more caches or scratchpads, portions of main memory, PIM-local registers, etc. The partitions 142 are depicted in FIG. 1 as being located on the microprocessor 110 for purposes of explanation, but embodiments are not limited to this example and the partitions 142 may be located in the microprocessor 110, in the memory modules 120, or elsewhere, depending upon a particular implementation. The size of the partitions 142 may be designated, for example, based upon the size of compute task data and a maximum number of partition entries that are needed for a particular implementation. The portions of memory designated for storing the partitions 142 may be contiguous or non-contiguous portions of memory and may vary from partition to partition. For example, some partitions may be implemented in contiguous portions of memory and other partitions may be implemented in non-contiguous portions of memory. The address range(s) and other data for the partitions 142 may be stored in the management data 146, as described in more detail hereinafter.

The address mapping data 144 is data that is used by the tasking manager 148 to determine which of the partitions 142 in which to store compute task data that is received from the threads 130. The address mapping data 144 maps memory address information to partitions and/or memory elements to allow a particular partition and/or memory element to be determined from given memory address information. According to an embodiment, the address mapping data 144 maps memory address information to partition Identification Data (IDs) and memory element IDs. As described in more detail hereinafter, the tasking manager 148 stores compute task data to the appropriate partitions and then uses the compute task data to issue compute tasks. The partition ID for a given compute task may be determined by some function of a subset of the address bits in the compute task data, specified by the address mapping data. The address mapping data 144 may be stored in any location that is accessible by the tasking mechanism 140, such as a dedicated memory location including one or more registers, an area of main memory, etc. In some embodiments, user level code may be prevented from directly accessing or manipulating the address mapping data 144 such that user software is unable to directly infer details of the underlying address mapping, and partitioning can occur completely transparently to the user software.

The tasking manager 148 manages compute task data stored in the partitions 142, including storing compute task data to the partitions 142 and issuing compute tasks using compute task data stored in the partitions 142. According to an embodiment, the tasking manager 148 is implemented by a microprocessor primitive, instruction, or memory-mapped target address that provides the functionality to store compute task data to the tasking mechanism 140 and more specifically, to one of the partitions 142, also referred to herein as a "push." Also provided is a primitive or instruction to cause the tasking mechanism 140 to execute the next compute task based upon compute task data stored in the partitions 142, also referred to hereinafter as a "pop." In another embodiment, the hardware primitive is an instruction which converts a compute task data address to a partition ID, which can be used by the thread to push compute task data to the appropriate partition of the compute task data software structure. In another embodiment, the hardware primitive simply represents an interface (e.g., a memory-mapped address or register) to extract the address mapping data (e.g., a bitmask indicating which address bits specify the partition ID) which can then be used by the thread to generate the partition ID from compute task data address and push the compute task data to the correct partition in software.

The management data 146 is data that is used by the tasking manager 148 to manage the partitions 142. This may include, for example, for each of the partitions 142, an address range(s) of the partition, a next push address at which the next compute task data is to be stored in the partition, and a next pop address from which the next compute task data is to be retrieved from the partition and used to issue a compute task. The management data 146 may include other data, depending upon a particular implementation (e.g., instead of next push/next pop address, the address of one or more head/tail/root/leaf nodes in a linked list or graph).

III. Managing Compute Task Data Using the Tasking Mechanism

Figure 2B:
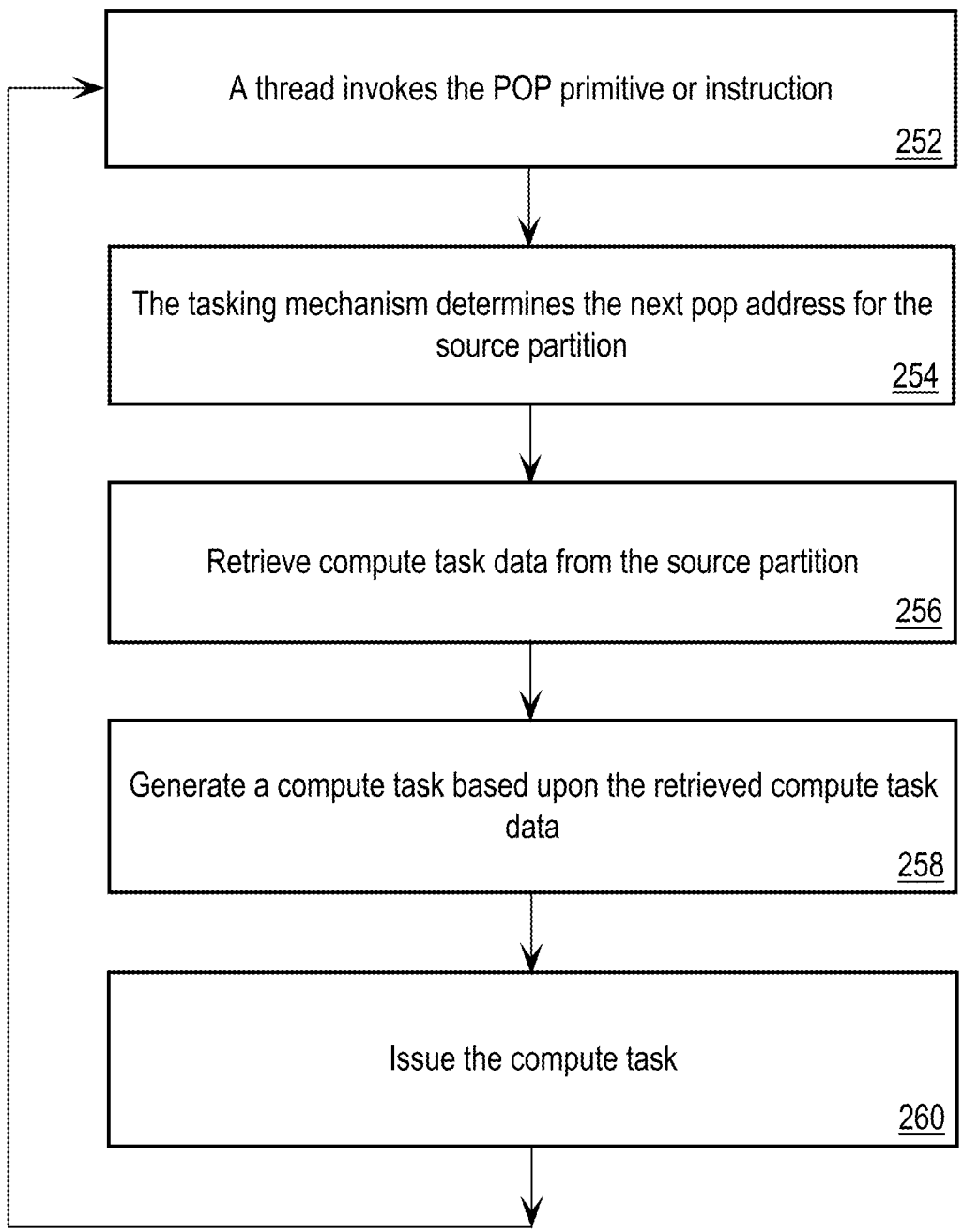
FIG. 2B is a flow diagram that depicts the tasking mechanism generating and issuing compute tasks.

FIGS. 2A and 2B are flow diagrams 200, 250, respectively, that depict managing compute task data using a tasking mechanism. The flow diagram 200 of FIG. 2A depicts a single thread pushing compute task data to the tasking mechanism 140 for purposes of explanation but is applicable to processing compute task data from any number of threads.

In step 202, a thread generates compute task data. This may occur at any time during thread execution. For example, while performing operations on data, the thread determines one or more next operations to be performed on data stored at a particular memory address and generates compute task data that specifies the operation(s), a memory address, and a value. One non-limiting example operation is an arithmetic operation, such as an addition, subtraction, etc., to be performed on data stored at a particular memory address. The thread may store the compute task data, for example, in one or more registers, cache, main memory, etc.

In step 204, the thread that generated the compute task data invokes the push primitive or instruction to push the compute task data that the thread generated to the tasking mechanism 140 and more specifically, to cause the compute task data to be stored in one of the partitions 142. The thread may provide address information in the compute task data, or a target virtual address to the compute task data, as an argument when invoking the primitive or instruction. The thread may invoke the push primitive or instruction when the thread produces the compute task data or at a later time. According to an embodiment, the thread pushes the compute task data to the tasking mechanism 140 using the primitive or instruction instead of issuing the compute task as would normally be done.

In step 206, address information in the compute task data is processed to determine a partition, i.e., a destination partition, in which to store the compute task data. Various techniques may be used to determine a destination partition based upon address information. According to an embodiment, a bit mask supplied by the address mapping data 144 is applied to memory address bits in the compute task data to generate resulting bits. The bit mask may comprise any number of bits that may vary depending upon a particular implementation and address mapping pattern. The resulting bits are then used to determine the partition in which the compute task data is to be stored, which corresponds to the memory element which the original address maps to in the underlying address mapping strategy.

In another embodiment, the partition is selected based on resource usage information present in the management data instead of, or in conjunction with, address information associated with the compute task. For example, if data needed for the compute task is minimal or data locality is less important in a system, it may be preferable to also consider the amount of available memory space at available memory elements or the load imbalance arising from varying number of tasks that are pending at each memory element when choosing a target partition. Considering this data, which can be queried from the management data 146, can help reduce load imbalance or memory space imbalance across different memory elements.

According to an embodiment, determination of a target partition based on address information, e.g., by applying a bitmask, is done based on the physical address bits of the specified address information. In some embodiments, generating a physical address from the supplied address information requires computation and/or translation. A base address and index offset, rather than a full address, may be supplied in the address information and the target address is calculated based upon the base address and index offset. This computation may be implemented in software or in hardware along the execution path (routing the relevant data to existing arithmetic units or duplicating all or parts of these arithmetic units for this execution path).

In some embodiments the address information is specified in a virtual address space and virtual address information is translated to the physical address space. However, in some embodiments, some or all of the target partition calculation may be performed prior to translation. In systems with page-based virtual to physical address translation, in the case of a bitmask, any bits which fall in the page offset region of the virtual address can be applied without translation. According to an embodiment, prior to performing the translation, the page size of the target virtual address is inspected (in hardware or software) to determine whether it encompasses all bitmask bits (or if this can be determined ahead of time, then it will have been stored in a register or hardwired). If translation is not necessary, the partition determination can be calculated immediately based on the virtual address. If translation is necessary, the virtual address is sent to a translation mechanism to generate the corresponding physical address.

According to an embodiment, memory address bit values are processed using a hash function to generate a hash value to determine the memory mapping. The hash function may be any type of hash function and embodiments are not limited to any particular type of hash function. The hash value is then used to determine the corresponding partition and memory element. In this example the address mapping data 144 maps hash values to partition IDs and memory element IDs.

After a destination partition has been determined in step 206, in step 208 a next push address is determined in the destination partition. The next push address is the next available address in the partition for storing compute task data. According to an embodiment, the partition ID for the destination partition is used to lookup a next push address in the management data 146. The management data 146 includes data that maps partition IDs to next push addresses. For example, the tasking manager 148 uses the partition ID of the destination partition and the management data 146 to determine a next push address for the destination partition. According to an embodiment, the next push address for each partition is maintained in the address mapping data 144 instead of the management data 146. The next push address for the partition may or may not be contiguous with the address where the last compute task data was stored in the partition, depending upon how the partition is stored in memory. Memory allocation may also be necessary, and the push primitive or instruction handles any allocation and memory striding that is required to store the compute task data to a location in memory that maps to the appropriate memory element. In one embodiment the push primitive is implemented as a hardware mechanism that takes a target partition ID and compute task data as an input, allocates space for the compute task data within the target partition if necessary (initiating the system call, then performing any copies or pointer updates as necessary for the underlying data structure), updates the "next push" information for the next caller (e.g., for a contiguous partition allocation this could involve incrementing a "next push" pointer by the size of the compute task data), and returns a pointer to the allocated space.

In step 210, the compute task data is stored to the destination partition. For example, the tasking manager 148 stores the compute task data to the next push address for the destination partition determined in step 208. This may be accomplished by the tasking manager 148 generating and issuing one or more store commands. Depending on the size of the compute task data and the address mapping data, it may be necessary to issue multiple store commands to non-contiguous strides of memory in order to ensure they map to the same memory element. The tasking manager handles this striding and also increments the next push address to the next available memory address in the partition and updates either the management data 146 or the address mapping data 144 with the new next push address, depending upon where next push addresses for partitions are stored.

According to an embodiment, compute task data is ordered in partitions based upon the time at which the compute task data was stored in the partitions. The order may be chronological (first-in-first-out), reverse chronological (first-in-last-out), partially ordered via a tree or graph structure based on specified or inferred dependencies, etc. Thus, compute task data received from multiple threads is stored together in the partitions 142 based upon when the compute task data was pushed by each of the threads to the tasking mechanism 140.

According to an embodiment, when a push primitive or command is invoked, instead of storing the compute task data to the destination partition, the address of the destination partition is returned to the thread. The thread then itself stores the compute task data to the partition using the received address. For example, suppose that thread T1 invokes the push primitive or instruction for particular compute task data. A destination partition is determined based upon address information contained in the compute task data, for example using a bit mask or hash function as previously described, to determine a destination partition that corresponds to the compute task data. The next push address for the destination partition, e.g., a memory address where the next compute task data for the destination partition should be stored, is determined using the management data 146 and returned to thread T1. Thread T1 then issues a command to store the compute task data at the next available address of the particular partition.

According to an embodiment, when a push primitive or command is invoked, instead of storing the compute task data to the destination partition, an indication (e.g., a numeric identifier) of the destination partition is returned to the thread. The thread then itself stores the compute task data to the identified partition. In some such embodiments, each application may maintain a set of next push addresses for each partition within its own virtual address space. For example, suppose that thread T1 invokes the push primitive or instruction for particular compute task data. A destination partition is determined based upon address information contained in the compute task data, for example using a bit mask or hash function as previously described, to determine a destination partition that corresponds to the compute task data. An indication of the destination partition is returned to thread T1, which then refers to a next push address it maintains for the destination partition, e.g., a memory address where the next compute task data for the destination partition should be stored, and then issues a command to store the compute task data at the next available address of the particular partition. Steps 202-210 are repeated for any number of threads and any number of pushes, which causes compute task data to be grouped together by PIM execution unit.

The flow diagram 250 of FIG. 2B depicts how the tasking mechanism 140 generates and issues compute tasks using compute task data stored in the partitions 142. In step 252, a thread invokes the pop primitive or instruction to cause the tasking manager 148 to generate and issue a compute task based upon the compute task data stored in a partition. The thread that invokes the pop primitive or instruction may be any thread, such as an administrative or background thread executing on the tasking mechanism 140, including the tasking manager 148, or a thread performing work, such as thread T1 in the threads 130, and the thread(s) that invoke the pop primitive or instruction may be the same or different than the thread that generated the compute task data. The thread that invokes the pop primitive or instruction may specify a source partition for which a compute task is to be issued, for example by specifying partition ID. Alternatively, the pop primitive or instruction may cause a compute task to be generated and issued from each partition that contains compute task data and where the corresponding command execution unit is ready to execute a next compute task.

In step 254, the tasking mechanism 140 determines the next pop address in the source partition. For example, the tasking manager 148 looks up in the management data 146 the next pop address for the source partition specified when the pop primitive or instruction was invoked. It may also perform additional checks such as inspecting compute task data to find the highest priority compute task or the next "ready" compute task to be issued.

In step 256, compute task data is retrieved from the source partition. For example, the tasking manager 148 loads the compute task data from the next pop address determined in step 254. According to an embodiment, the tasking manager 148 updates the next pop address, such as a pointer, for the source partition and updates the management data 146 with the updated pop address.

In step 258, a compute task is issued based upon the retrieved compute task data. For example, in the context of PIM, the tasking manager 148 constructs a fully valid PIM command using the compute task data, e.g., using the address, operation and values specified by the compute task data and the ID of the PIM execution unit that corresponds to the source partition. In step 260, the compute task is issued. For example, the tasking manager 148 causes the PIM command generated in step 258 to be issued to the memory system of the microprocessor arrangement 100.

Steps 252-260 may be repeated any number of times and for any number of partitions in parallel. PIM commands for different partitions may be generated and issued to their respective PIM execution units in parallel since the PIM commands are issued to different PIM execution units.

Using the approach described above, the tasking mechanism 140 ensures that all of the target operands for a PIM command map to the same memory element while avoiding PIM collisions or memory contention from separate threads, without threads having to be aware of the particular hardware implementation of memory modules and more specifically, how addresses map to physical memory elements, such as PIM execution units.

Figure 3B:
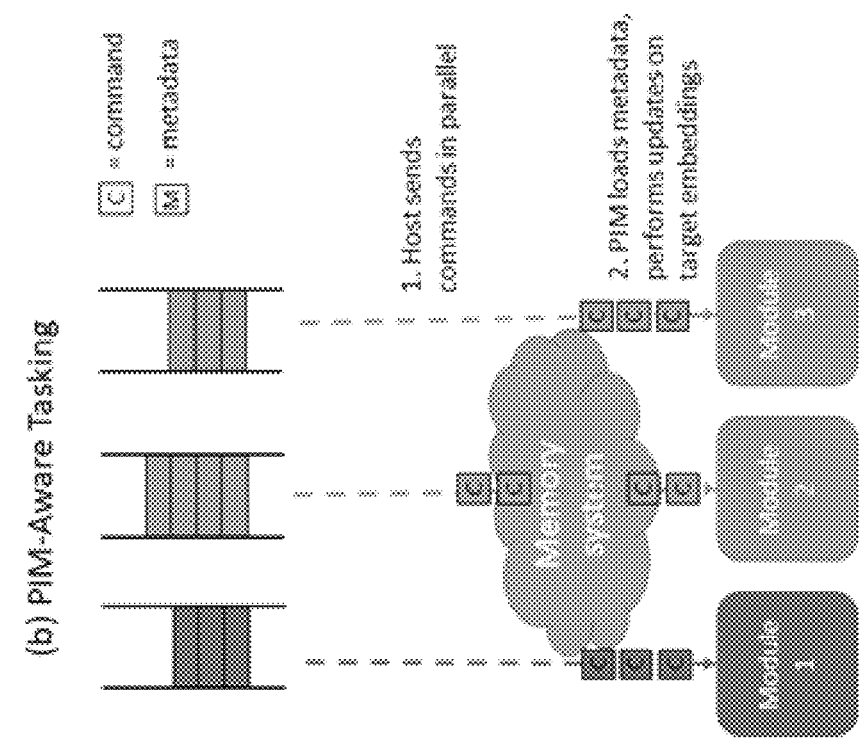
FIG. 3B is a block diagram that depicts managing PIM commands in a multi-threaded environment using a tasking mechanism.
Figure 3A:
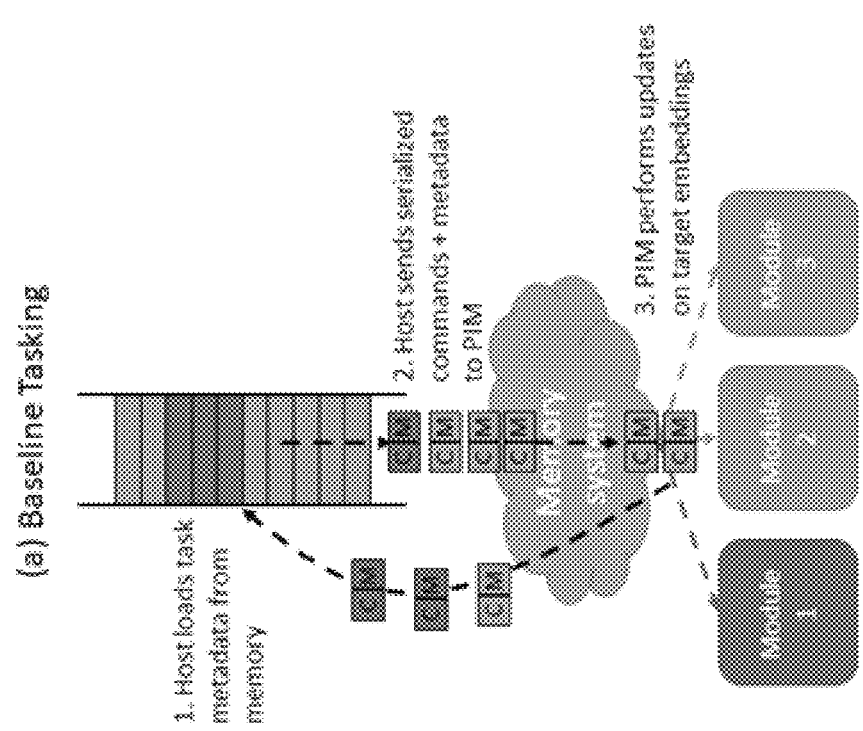
FIG. 3A is a block diagram that depicts a conventional baseline tasking approach for managing PIM commands in a multi-threaded environment.

FIG. 3A is a block diagram that depicts a conventional baseline tasking approach for managing PIM commands in a multi-threaded environment running an irregular application. In FIGS. 3A and 3B the term "Module" refers to a memory element. Host threads load compute task data from memory and generate PIM commands. For example, a thread loads compute task data that specifies an address, an operation such as an arithmetic operation, and a value. The thread generates a PIM command using the compute task data loaded from memory. PIM commands from multiple host threads are serialized to avoid PIM collisions and are issued one at a time to the memory system. This is necessary since no assumptions can safely be made about where data will be stored, and which destination PIM execution units will process PIM commands. This can result in performance degradation if PIM commands for different destination PIM execution units are not sufficiently interleaved because some PIM execution units may be left idle while they wait for a next PIM command.

FIG. 3B is a block diagram that depicts managing PIM commands in a multi-threaded environment using a tasking mechanism. As previously described herein, threads push compute task data to the tasking mechanism instead of generating and issuing their own PIM commands. This may be performed as soon as compute task data is generated, eliminating the conventional step of storing compute task data to memory. The tasking mechanism stores the compute task data to partitions based upon address information in the compute task data, so that all of the compute task data for each destination PIM execution unit are grouped together. As depicted in FIG. 3B, in response to one or more pop commands, the tasking mechanism generates and issues PIM commands to the memory system, which may be performed in parallel for multiple PIM execution units and memory modules. The use of a tasking mechanism in this manner improves parallelism, eliminates PIM collisions, and ensures that all of the operands for a PIM command map to the same memory element, without the host threads having to be aware of how memory addresses map to physical memory elements and more specifically, to PIM execution units and memory modules. All of these benefits except for avoiding PIM collisions are also realized in NUMA implementations.

The invention claimed is:

1. A microprocessor configured to:
responsive to a thread invoking a push instruction to store first compute task data, store the first compute task data to a first memory location associated with a first memory element of a memory system corresponding to the first compute task data,
generate a first compute task based upon the stored first compute task data, and
cause the first compute task to be issued to the first memory element.

2. The microprocessor of claim 1, wherein the microprocessor is further configured to determine the first memory element that corresponds to the first compute task data based upon resource usage of a plurality of memory elements that includes the first memory element.

3. The microprocessor of claim 1, wherein the microprocessor is further configured to:
process address information in the first compute task data to generate processing results, and
use the processing results to determine the first memory element that corresponds to the first compute task data.

4. The microprocessor of claim 1, wherein the microprocessor is further configured to determine, based upon the first compute task data, the first memory element that corresponds to the first compute task data by one or more of:
applying a mask to at least a portion of address information in the first compute task data, or
processing at least a portion of the address information in the first compute task data using a hash function.

5. The microprocessor of claim 1, wherein the microprocessor is further configured to:

responsive to the thread invoking a second push instruction to store second compute task data that is different than the first compute task data, store the second compute task data to one or more of the first memory location or a second memory location, wherein both the first memory location and the second memory location are in the same memory element, and generate a second compute task based upon the stored second compute task data and cause the second compute task to be issued to the memory system.

6. The microprocessor of claim 5, wherein the first compute task data is received from a first thread and the second compute task data is received from a second thread that is different than the first thread.

7. The microprocessor of claim 1, wherein the microprocessor is further configured to:

responsive to the thread invoking a second push instruction to store second compute task data that is different than the first compute task data, store the second compute task data to a second memory location that is in a different memory element than the first memory location, and generate a second compute task based upon the stored second compute task data and cause the second compute task to be issued to the memory system.

8. The microprocessor of claim 7, wherein the second compute task is issued to the memory system in parallel with the first compute task.

9. The microprocessor of claim 1, wherein:

the first compute task is a PIM command for a PIM-enabled memory element, and causing the first compute task to be issued to the memory system includes causing the PIM command to be issued to the PIM-enabled memory element.

10. A computer-implemented method comprising:

a microprocessor:

responsive to a thread invoking a push instruction to store first compute task data, storing the first compute task data to a first memory location associated with a first memory element of a memory system corresponding to the first compute task data, generating a first compute task based upon the stored first compute task data, and causing the first compute task to be issued to the first memory element.

11. The computer-implemented method of claim 10, further comprising determining, by the microprocessor, the first memory element that corresponds to the first compute task data based upon resource usage of a plurality of memory elements that includes the first memory element.

12. The computer-implemented method of claim 10, further comprising:

processing, by the microprocessor, address information in the first compute task data to generate processing results, and using, by the microprocessor, the processing results to determine the first memory element that corresponds to the first compute task data.

13. The computer-implemented method of claim 10, further comprising determining, by the microprocessor based upon the first compute task data, the first memory element that corresponds to the first compute task data by one or more of:

applying a mask to at least a portion of address information in the first compute task data, or processing at least a portion of the address information in the first compute task data using a hash function.

14. The computer-implemented method of claim 10, further comprising:

responsive to the thread invoking a second push instruction to store second compute task data that is different than the first compute task data, storing, by the microprocessor, the second compute task data to one or more of the first memory location or a second memory location, wherein both the first memory location and the second memory location are in the same memory element, and generating, by the microprocessor, a second compute task based upon the stored second compute task data and cause the second compute task to be issued to the memory system.

15. The computer-implemented method of claim 14, wherein the first compute task data is received from a first thread and the second compute task data is received from a second thread that is different than the first thread.

16. The computer-implemented method of claim 10, further comprising:

responsive to the thread invoking a second push instruction to store second compute task data that is different than the first compute task data, storing, by the microprocessor, the second compute task data to a second memory location that is in a different memory element than the first memory location, and generating, by the microprocessor, a second compute task based upon the stored second compute task data and cause the second compute task to be issued to the memory system.

17. The computer-implemented method of claim 16, wherein the second compute task is issued to the memory system in parallel with the first compute task.

18. The computer-implemented method of claim 10, wherein:

the first compute task is a PIM command for a PIM-enabled memory element, and causing the first compute task to be issued to the memory system includes causing the PIM command to be issued to the PIM-enabled memory element.

19. A system comprising:

a memory system comprising a plurality of memory elements; and a microprocessor configured to:

responsive to a thread invoking a push instruction to store first compute task data, store the first compute task data to a first memory location associated with a first memory element corresponding to the first compute task data, generate a first compute task based upon the stored first compute task data, and cause the first compute task to be issued to the first memory element.

20. The system of claim 19, wherein:

the first compute task is a PIM command for a PIM-enabled memory element, and causing the first compute task to be issued to the memory system includes causing the PIM command to be issued to the PIM-enabled memory element.

* * * * *